(12) United States Patent
Paris et al.

(10) Patent No.: US 9,465,943 B2
(45) Date of Patent: Oct. 11, 2016

(54) EXTENSION OF A PLATFORM CONFIGURATION REGISTER WITH A KNOWN VALUE

(71) Applicant: Red Hat, Inc., Raleigh, NC (US)

(72) Inventors: Eric L. Paris, Raleigh, NC (US); Daniel J. Walsh, Marlborough, MA (US)

(73) Assignee: Red Hat, Inc., Raleigh, NC (US)

( * ) Notice: Subject to any disclaimer, the term of this patent is extended or adjusted under 35 U.S.C. 154(b) by 265 days.

(21) Appl. No.: 13/756,194

(22) Filed: Jan. 31, 2013

(65) Prior Publication Data

US 2014/0215202 A1 Jul. 31, 2014

(51) Int. Cl.
*G06F 11/30* (2006.01)
*G06F 21/57* (2013.01)
*G06F 17/30* (2006.01)

(52) U.S. Cl.
CPC ............ *G06F 21/572* (2013.01); *G06F 17/30* (2013.01)

(58) Field of Classification Search
CPC .... G06F 21/572; G06F 21/575; G06F 21/64; G06F 21/51; G06F 21/57; G06F 21/00; H04L 9/32

USPC ........................................................ 713/187
See application file for complete search history.

(56) References Cited

U.S. PATENT DOCUMENTS

| | | | |
|---|---|---|---|
| 7,191,464 B2* | 3/2007 | Cromer et al. | 726/2 |
| 7,725,703 B2* | 5/2010 | Hunter et al. | 713/2 |
| 7,908,483 B2* | 3/2011 | Iliev et al. | 713/176 |
| 8,694,762 B2* | 4/2014 | Ekberg | 713/1 |
| 2005/0138393 A1* | 6/2005 | Challener | G06F 21/6218 713/186 |
| 2006/0155988 A1* | 7/2006 | Hunter et al. | 713/164 |
| 2006/0236122 A1* | 10/2006 | Field et al. | 713/187 |
| 2012/0102313 A1* | 4/2012 | Nicolson et al. | 713/2 |

OTHER PUBLICATIONS

Jonathan M. McCune, Bryan Parno, Adrian Perrig, Michael K. Reiter, and Arvind Seshadri, Minimal TCB Code Execution.*

* cited by examiner

*Primary Examiner* — Ali Abyaneh
(74) *Attorney, Agent, or Firm* — Lowenstein Sandler LLP

(57) ABSTRACT

A computing system calculates a hash value of binary of a component of the computing system using a hash function and determines whether a signature that is associated with the binary of the component is valid. A trusted platform module in the computing system extends a platform configuration register value in the trusted platform module using a known value that is associated with the binary if the signature is valid.

17 Claims, 4 Drawing Sheets

EXTENSION OF A PLATFORM CONFIGURATION REGISTER WITH A KNOWN VALUE

TECHNICAL FIELD

The embodiments of the disclosure relate generally to platform configuration registers, and, in particular to extending a platform configuration register with a known value.

BACKGROUND

Electronic device use continues to grow, and conservative estimates suggest that tens of billions of electronic devices are in active use. Many of these devices are mobile and web-enabled. Similarly, the growth of malicious code, viruses, cyber espionage, malware, etc., tracks the growth of electronic device use. Great time and effort is expended to certify that the integrity of the software (e.g., operating system) is intact in these electronic devices. In other words, determining that software running on the electronic device has not been illegitimately modified is an important step in creating a trusted computing environment.

The ability to protect the software of the electronic device is limited by the manner in which trust is created or "rooted" in the electronic device. The Trusted Computing Group ("TCG") develops open standards and specifications for trusted computing. According to the specifications, trust within a given data processing system may be based on a trusted platform module ("TPM").

TPM techniques can be implemented in a variety of platforms including servers, desktops, notebooks, or handheld computing devices. The purpose of the TPM is to provide computer identity and secure services related to transactions, protecting user data, and other special functions. Current trusted computing mechanisms, which root the integrity of a platform, do so by "extending" a platform configuration register with a cryptographic hash representing the binary of the software. If, however, the binary of the software changes, which is prone to happen, then the cryptographic hash also changes. When any update is made to a trusted binary, an update should also be made to the contents of the platform configuration register.

BRIEF DESCRIPTION OF THE DRAWINGS

Embodiments of the present disclosure are illustrated by way of example, and not by way of limitation, and can be more fully understood with reference to the following detailed description when considered in connection with the figures in which.

DETAILED DESCRIPTION

Described herein are methods and systems for establishing a chain of trust by extending platform configuration registers with known values. A chain of trust can be established by validating hardware components and software components in a computing system to ensure that only trusted software and hardware can be used. A computing system, under implementations of this disclosure, can include a trusted platform module. The trusted platform module can be a microprocessor that includes a data store (e.g., platform configuration registers) to store data when the computing system validates the integrity of the computing system components (e.g., hardware components, software components). According to various implementations, when the computing system validates the signature of a component, the trusted platform module extends a platform configuration register with a known value (e.g., public key associated with the signature of the component) instead of extending the platform configuration register with a hash value that is based on the binary of the component. A known value represents a value that is known or available to the public. An example of a known value can include, and is not limited to, a public key in public-key cryptography systems. A binary hereinafter refers to a type of binary file that contains machine code for a component, which the computing system can execute. Extending the platform configuration registers with a known value (e.g., public key), instead of extending the platform configuration registers with hash values that are based on the binary of the components, beneficially, allows the contents of the binary for a component to change without having to update the contents of the platform configuration registers.

Figure 1:
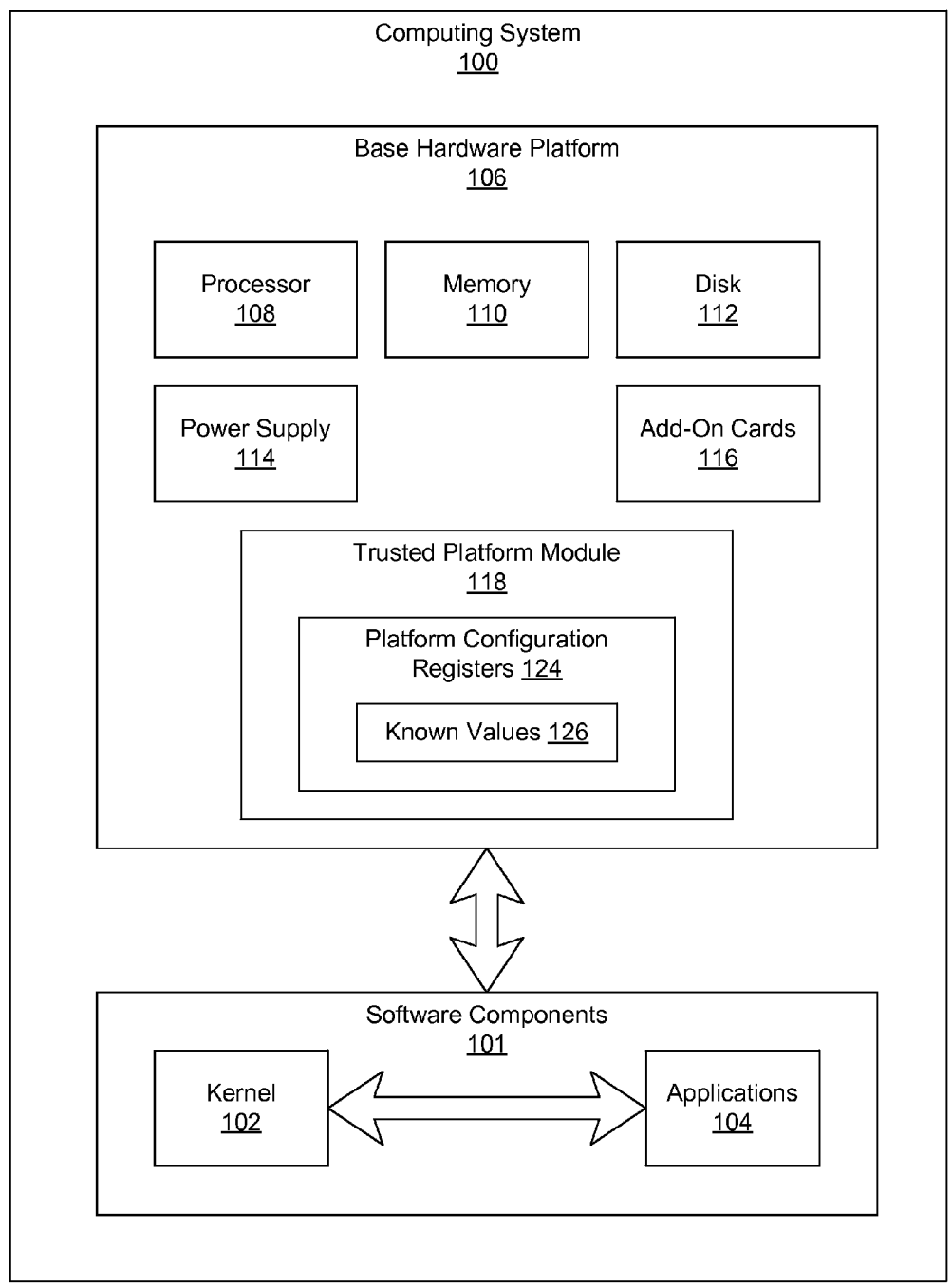
FIG. 1 illustrates one embodiment of a computing system, in accordance with various implementations.

FIG. 1 illustrates one implementation of a computing system 100 having a trusted platform architecture. The computing system 100 may be configured with various hardware components (e.g., base hardware platform 106) to support the execution of software components 101 that may include a kernel 102 and applications 104. The base hardware platform 106 may include a processor 108, memory 110, a storage disk 112, a power supply 114, various add-on cards 116, and a trusted platform module 118. The trusted platform module 118 can include platform configuration registers 124 to store data. One implementation of the trusted platform module is described in greater detail below in conjunction with FIG. 2. Although not shown, multiple interfaces can be used to couple the devices of the base hardware platform 106 to each other and other components of the computing system 100.

The hardware components in the base hardware platform 106 and the software components 101 may each be associated with binary, and may have a signature that is attached or supplied with the binary. The signature may have been created, for example, by hashing the binary and encrypting the hash of the binary. The computing system 100 can take an integrity measurement of the binary for a component and can verify if the signature that is associated with the binary is valid. The computing system 100 can use an asymmetric key signature algorithm to determine if the signature that is associated with the binary is valid. An example of an integrity measurement can include, and is not limited to, hash sums of files or data that are associated with the binary of the component.

The trusted platform module 118 can extend a platform configuration register 124 with a known value 126 based on the determination made by the computing system 100 of whether a signature that associated with the binary of a component is valid. An example of a known value 126 can include, and is not limited to, a public key. The term "public key" refers to a public-key cryptography system that utilizes two separate keys, a private key and a public key. The private key and the public key are mathematically linked.

One key may lock data or encrypt the data, and the other key may unlock data or decrypt the data. For example, a private key may have been used to encrypt a hash of a binary of a component to create a signature for the binary. The public key that is associated with the private key may be used to decrypt the signature. The public key, as the name implies, is published. Throughout this disclosure, a trusted platform module 118 collectively represents any kind of trusted platform module, including a trusted platform module 118 implemented using software, firmware, hardware, or a combination thereof.

The computing system 100 can check, for the various components, whether a signature that is associated with the binary of a particular component is valid. Each time the computer system 100 makes a determination of whether a signature is valid, the trusted platform module 118 can extend the platform configuration register 124 with a known value 126. One implementation of the trusted platform module extending the platform configuration register with a known value is described in greater detail below in conjunction with FIG. 3.

For example, the base hardware platform 106 may be a motherboard having firmware (e.g., power-on self-test basic input/output systems, or "POST BIOS"), that executes before the software components 101 (e.g., kernel 102, operating system, or applications 104) initialize. For example, the firmware may execute before a boot loader executes. A boot loader is a computer program that loads the main operating system or runtime environment for the computer after completion of the self-tests. In another example, the boot loader may execute before the kernel of the operating system executes, and the kernel may execute before any binary for applications 104 in the userspace of the operating system are executed. When the computing system 100 receives power from the power supply 114, the firmware may take an integrity measurement for the binary of the boot loader and may determine whether the signature that is associated with the binary of the boot loader is valid. If the firmware determines that the signature that is associated with the boot loader is valid, the trusted platform module 118 can extend a platform configuration register 124 with a known value 126 (e.g., public key that is associated with the boot loader).

The computing system 100 may then execute the boot loader. The boot loader may take an integrity measurement for the binary of the kernel and may determine whether the signature that is associated with the binary of the kernel is valid. If the boot loader determines that the signature that is associated with the kernel is valid, the trusted platform module 118 can extend the current value in the platform configuration register 124 using a known value 126 (e.g., public key) that is associated with the kernel. The computing system 100 can iterate through checking the integrity of the components and the validating the signatures that are associated with the binaries of the components. The number of iterations can be based on the number of components.

Figure 2:
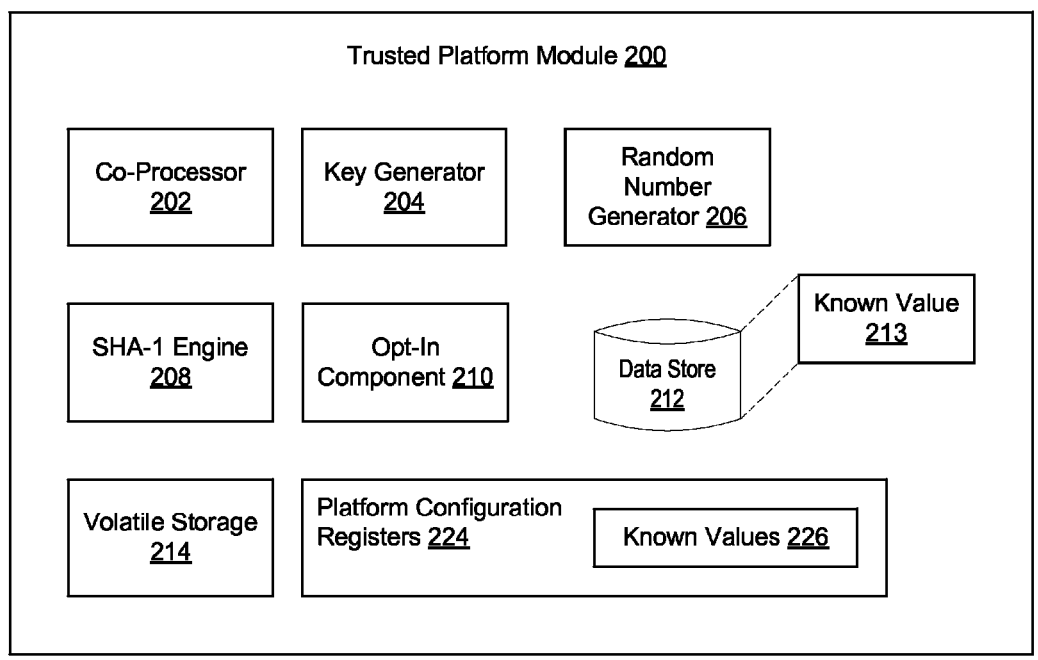
FIG. 2 is a block diagram illustrating one embodiment of a trusted platform module.

FIG. 2 is a block diagram illustrating one implementation of the trusted platform module 200. The client distribution module 300 may correspond to a client distribution module 138 in a client machine 102 of FIG. 1. The trusted platform module 200 can extend the value of a platform configuration register 224 with a known value 226. In one implementation, the trusted platform module 200 includes components specified by the Trusted Computing Group ("TCG") specification. The trusted platform module 200 can be implemented in software and/or hardware that is compatible with a trusted platform module specification set forth, for example, by the TCG standard body The components can include, for example, a cryptographic co-processor 202, a key generator 204, a random number generator 206, a SHA-1 engine 208, an opt-in component 210, a volatile storage 214, platform configuration registers 224, and one or more data stores 212, 215. Note that in alternative implementations, the functionality of one or more of the components can be combined or divided.

The cryptographic co-processor 202 can perform cryptographic operations within the trusted platform module 200. The key generator 204 can create symmetric keys and RSA asymmetric cryptographic key pairs. The random number generator 206 can provide randomness for the computation of various values such as keys or other values. The opt-in component 210 can maintain the state of persistent and volatile flags and can enforce semantics associated with those flags such that the trusted platform module 200 can be enabled and disabled. The data store 215 can store persistent identity and state information that is associated with the trusted platform module 200. The data store 215 can be non-volatile memory.

The trusted platform module 200 can include a set of platform configuration registers 244. In one implementation, the trusted platform module 200 includes at least sixteen platform configuration registers 224. In one implementation, the platform configuration registers 224 are each twenty bytes. The platform configuration registers 224 can reside in volatile and/or non-volatile memory. A subset of the set of platform configuration registers 244 can be designated for hardware components and another subset of the set of platform configuration registers 244 can be designated for software components. For example, PCR-1 may be used for the motherboard manufacturer, PCR-2 may be used for the processor, PCR-3 may be used for the firmware, etc. In one implementation, registers 0-7 are reserved for trusted platform module use and registers 8-15 are available for operating system and application use.

The platform configuration registers 224 values can be temporal and can be reset at computing system reboot. In one embodiment, the values that are stored in one of the platform configuration registers 224 are "extendable," in that the value for a particular platform configuration register is based on an aggregate of data. For example, the current value that is stored in one the platform configuration registers 224 (e.g., PCR-1) may be changed by hashing the current value in the platform configuration register 224 (e.g., PCR-1) with a new value to result in the "extended value" for the platform configuration registers 224 (e.g., PCR-1). In one implementation, the current value in a platform configuration register 224 is changed, for example, by a component (e.g., firmware, boot loader, kernel, application, etc.) sending an "Extend( )" operation to the trusted platform module 200.

The trusted platform module 200 can update the current value in a platform configuration register 224 using a known value 226. In one implementation, the known value 226, 213 is a public key. In one implementation, the known value 226, 213 can be a predefined static value. In one implementation, the known value 226, 213 is a user-defined value. The known value 226 that should be stored in the platform configuration register 224 can be based on a determination of whether the signature that is associated with binary of a component is valid. For example, if signature is valid, the trusted platform module 200 can use a public key that is associated with the component as the known value 226. In another example, if the signature is not valid, the trusted platform module 200 can use a null value as the known value 226. One implementation of the trusted platform module extending a platform configuration register is described in greater detail below in conjunction with FIG. 3.

In one implementation, the known value 226, 213 is provided by a component vendor and/or component manufacturer. For example, an operating system can provide a public key that is associated with a private key that was used to create a signature for binary associated with the operating system. In one implementation, the trusted platform module 200 stores the known values 213, for example, in a data store 212 (e.g., non-volatile memory) in the trusted platform module 200. In another implementation, the known values 226, 213 are stored in a data store that is coupled to the trusted platform module.

When a platform configuration register 224 is to be updated, the SHA-1 engine 208 can implement the SHA-1 hash algorithm to calculate the new value for the platform configuration register 224 by hashing the current value in the platform configuration register 224 with a given value. For example, the current value that is stored in PCR-1 may be changed by the SHA-1 engine 208 hashing the current value in PCR-1 with a new value (e.g., public key) to result in the "extended value" for PCR-1.

Figure 3:
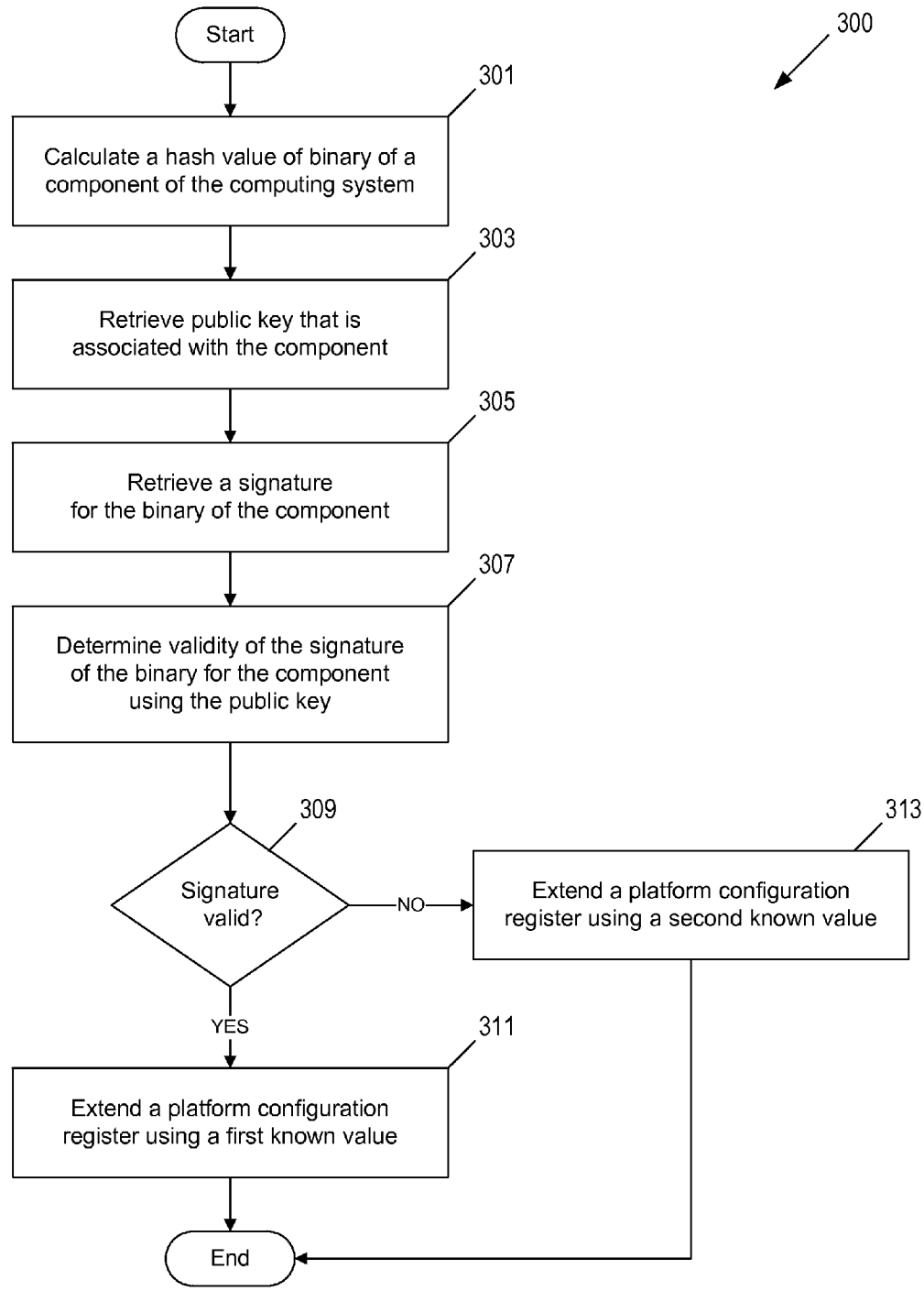
FIG. 3 illustrates a flow diagram of one embodiment of a method for extending a platform configuration register value with a known value.

FIG. 3 illustrates a flow diagram of one embodiment of a method 300 for extending a platform configuration register value with a known value. The method may be performed by processing logic that may comprise hardware (circuitry, dedicated logic, etc.), software (such as is run on a general purpose computer system or a dedicated machine), or a combination of both. In one embodiment, at least a portion of the method is performed by a trusted platform module (e.g., trusted platform module 200 of FIG. 1) in a computing system (e.g., computing system 100 in FIG. 1). In one embodiment, at least a portion of the method is performed by hardware components (e.g., components in base hardware platform 106 in FIG. 1) and/or software components (e.g., software components 101 in FIG. 1) in a computing system (e.g., computing system 100 in FIG. 1).

At block 301, the computing system calculates a hash value of binary of a component of the computing system. For example, the computing system may identify a system start event. For example, the computing system may be initializing after a power down or reset/restart event, and the firmware of the motherboard of the computing system may be the first component to launch after power-up. The firmware may calculate a hash (e.g., cryptographic hash) of the binary of the boot loader. A cryptographic hash is a hash function that returns a fixed-size bit string as a result. In one embodiment, the cryptographic hash function is SHA-1. Alternatively, any suitable cryptographic hash function may be used to calculate the hash for the binary.

At block 303, The computing system retrieves a public key that corresponds to the component from a storage area (e.g., non-volatile storage of the trusted platform module 200 in FIG. 2). At block 305, the computing system retrieves the digital signature that is associated with the binary of the component. The digital signature of the binary of the component may be originally "signed" by a platform vendor using the private key of the platform vendor. The platform vendor may have hashed the binary, and may have then encrypted the hash of the binary using the private key to create the digital signature for the binary. In one implementation, the digital signature for the component is stored in a data store in the computing system, and the digital signature is retrieved from the data store at block 305.

At block 307, the computing system determines whether the signature that is associated with the binary of the component is valid using the public key. The computing system can use an asymmetric key signature algorithm to determine whether the signature is valid. If the signature is valid (block 309), the trusted platform module in the computing system, extends a platform configuration register in the trusted platform module using a known value at block 311. In one implementation, the known value used when the signature is valid is the public key that is associated with the component. and sends an extend operation request to the trusted platform module. In one implementation, the trusted platform module receives an extend operation request from a component. The extend operation request can include an identifier of the platform configuration register that is to be extended and can include the known value (e.g, public key) that the trusted platform module should use to extend the current value of the platform configuration register.

If the signature is not valid (block 309), the trusted platform module in the computing system, extends a platform configuration register in the trusted platform module using another known value at block 313. In one implementation, the known value used when the signature is not valid is a null value. In another implementation, the known value used when the signature is not valid is the hash value that is generated by hashing the binary of the component. The known value used when the signature is not valid can be another known value that is different from the known value that is used when the signature is valid. In one implementation, the trusted platform module receives an extend operation request from a component. The extend operation request can include an identifier of the platform configuration register that is to be extended and can include the known value (e.g, null value, hash value) that the trusted platform module should use to extend the current value of the platform configuration register.

For example, at block 301, the firmware calculates a hash value of the binary of the boot loader component using a SHA-1 hash function. At block 303, the firmware retrieves the public key that is associated with the boot loader component from a data store in the computing system. At block 305, the firmware retrieves the digital signature for the boot loader from a data store in the computing system. The digital signature may have been created by the component vendor using the SHA-1 hash algorithm. At block 307, the firmware decrypts the digital signature for the boot loader using the public key for boot loader to generate a hash value from the decrypted signature. At block 307, the firmware compares the hash value that was identified from decrypting the digital signature using the public key with the hash value that was created by the firmware using a SHA-1 hashing function on the binary of the boot loader, for example, from block 301.

If the hash values match, the firmware determines that the signature is valid at block 309, and sends an extend operation request to the trusted platform module. The extend operation request can include an identifier of the platform configuration register that is to be extended and can include the known value (e.g, public key) that the trusted platform module should use to extend the current value of the platform configuration register. If the hash values do not match, the firmware determines that the signature is not valid at block 309, and sends an extend operation request to the trusted platform module. The extend operation request can include an identifier of the platform configuration register that is to be extended and can include the known value (e.g, null value, hash value) that the trusted platform module should use to extend the current value of the platform configuration register.

In one implementation, the SHA-1 engine (e.g., SHA-1 engine 208 in FIG. 2) in the trusted platform module can implement the SHA-1 hash algorithm to calculate the new value for updating the platform configuration register by hashing the current value in the platform configuration register with the known value. For example, if the signature is valid, the current value that is stored in PCR-1 may be changed by the SHA-1 engine hashing the current value in PCR-1 with the known value (e.g., public key) to generate a new value for PCR-1. The trusted platform module can replace the current value for the platform configuration register with the new value.

In one implementation, the computing system iterates method 300 to check the integrity of the components and to validate the signatures that are associated with the binaries of the components. The number of iterations can be based on the number of components. For example, the computing system may continue the boot up sequence by measuring the next component in the boot up sequence. For instance, the firmware may perform at least a portion of method 300 with respect to a boot loader, then the boot loader may perform at least a portion of the method 300 with respect to the kernel of the operating system, and the kernel may perform at least a portion of the method 300 with respect to a binary of an application.

The stored values in the platform configuration registers can be used to provide state information to another system and/or sub-system. For example, the computing system may be a mobile user device. The mobile user device has been requested to provide its trusted platform module state information to a cell phone tower before the tower before the cellular tower will allow the mobile user device to access to the cellular network. In another example, the computing system may reside in a data center. The computer system may be requested to provide its trusted platform module state information to a server before the computing system is given access to the rest of the network. In another example, the computing system is requested by a disk reader to provide its trusted platform module state information to the disk reader before an encrypted disk is unlocked.

Figure 4:
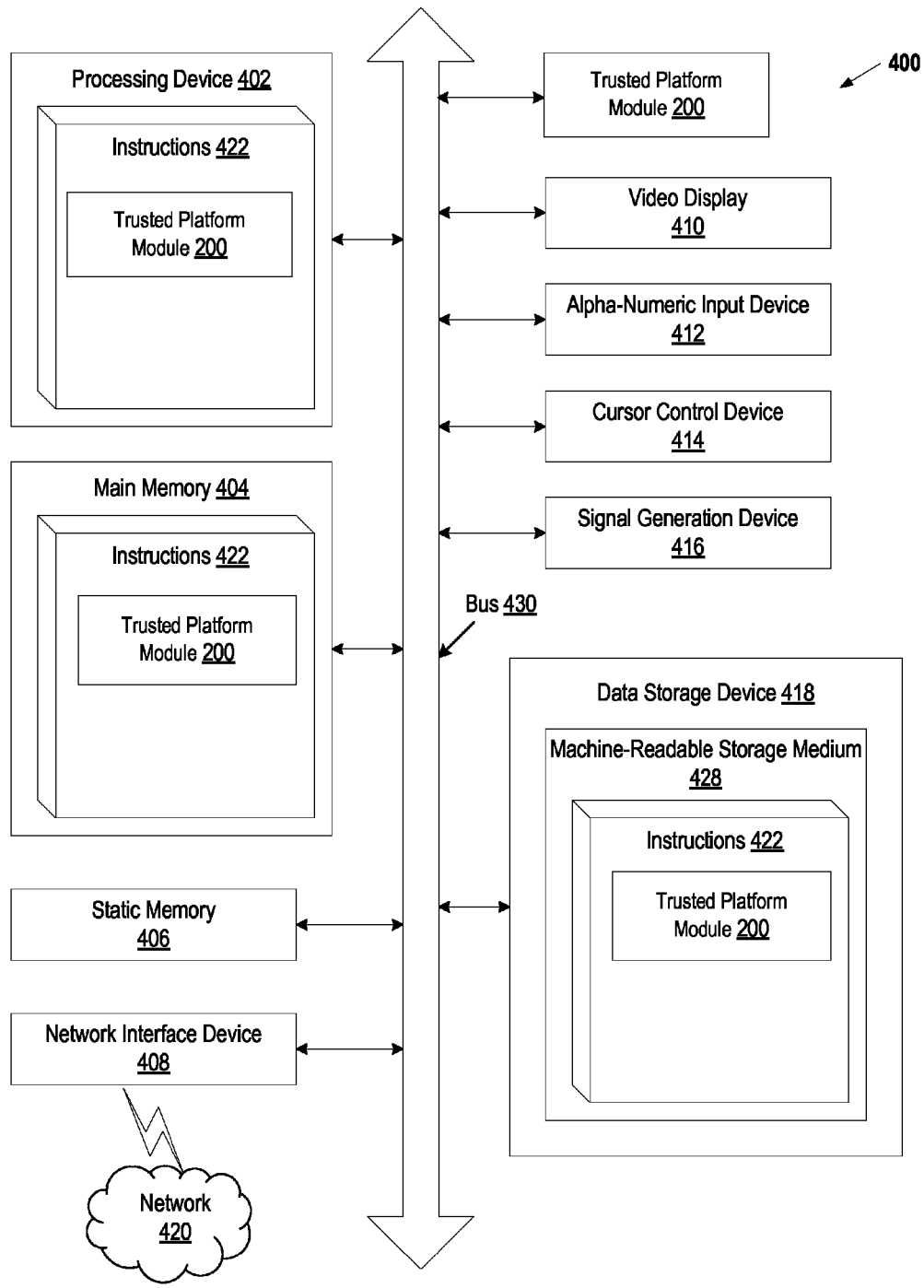
FIG. 4 is a block diagram of an example computer system that may perform one or more of the operations described herein.

FIG. 4 illustrates an example machine of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 402 is configured to execute instructions 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-readable storage medium 428 (also known as a computer-readable medium) on which is stored one or more sets of instructions or software 422 embodying any one or more of the methodologies or functions described herein. The instructions 422 may also reside, completely or at least partially, within the main memory 404 and/or within the processing device 402 during execution thereof by the computer system 400, the main memory 404 and the processing device 402 also constituting machine-readable storage media.

In one implementation, the computer system 400 include a trusted platform module 200 that is coupled to the process device 402, main memory 404, static memory 406, network interface device 408, video display 410, alpha-numeric input device 412, cursor control device 414, signature generation device 416, and data store device 418 via the bus 430. In one implementation, the instructions 422 include instructions for a trusted platform module (e.g., trusted platform module 200 of FIG. 1) and/or a software library containing methods that call modules in a trusted platform module. While the machine-readable storage medium 428 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "calculating" or "determining" or "extending" or "retrieving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

We claim:

1. A method comprising:
creating, by a processing device, a first hash value of a binary of a component of a computing system using a hash function;
retrieving, by the processing device, a signature created by a provider of the component from a data store of the computing system;
creating a second hash value from the signature created by the provider of the component;
determining whether the signature that is created by the provider of the component is valid by comparing the second hash value to the first hash value;
generating, by the processing device, a first platform configuration register value using a public key associated with the signature responsive to determining that the signature that is created by the provider of the component is valid;
validating, by the processing device, integrity of the component of the computing system by replacing a current platform configuration register value in a trusted platform module with the first platform configuration register value; and
generating, by the processing device, a second platform configuration register value using the first hash value that is generated by hashing the binary of the component responsive to determining that the signature that is created by the provider of the component is not valid.

2. The method of claim 1, further comprising:
retrieving the public key from the data store.

3. The method of claim 1, wherein the public key is a public key of the provider of the component.

4. The method of claim 1, wherein the public key is associated with the component of the computing system.

5. The method of claim 1, further comprising:
replacing the current platform configuration register value in the trusted platform module with the second platform configuration register value responsive to determining that the signature is not valid.

6. The method of claim 1, further comprising:
for each of a plurality of components in a boot sequence of the computing system:
calculating the first hash value of the binary for a corresponding component using the hash function;
determining whether a respective signature associated with the binary of the corresponding component is valid; and
extending the current platform configuration register value using a corresponding public key associated with the respective signature if the respective signature is valid to generate a respective first platform configuration value.

7. A non-transitory computer readable storage medium including instructions that, when executed by a processing device, cause the processing device to:
create a first hash value of a binary of a component of a computing system using a hash function;
retrieve a signature created by a provider of the component from a data store of the computing system;
create a second hash value from the signature created by the provider of the component;
determine whether the signature that is created by the provider of the component is valid from a comparison of the second hash value to the first hash value;

generate, by the processing device, a first platform configuration register value using a public key associated with the signature responsive to a determination that the signature that is created by the provider of the component is valid;

validate integrity of the component of the computing system by replacement of a current platform configuration register value in a trusted platform module with the first platform configuration register value; and generate, by the processing device, a second platform configuration register value using the first hash value that is generated from hashing the binary of the component responsive to a determination that the signature that is created by the provider of the component is not valid.

8. The non-transitory computer readable storage medium of claim 7, wherein the processing device is further to:
retrieve the public key from the data.

9. The non-transitory computer readable storage medium of claim 7, wherein the public key is a public key of the provider of the component.

10. The non-transitory computer readable storage medium of claim 7, wherein the public key is associated with the component of the computing system.

11. The non-transitory computer readable storage medium of claim 7, wherein the processing device is further to:
replace the current platform configuration register value in the trusted platform module with the second platform configuration register value responsive to a determination that the signature is not valid.

12. The non-transitory computer readable storage medium of claim 7, wherein the processing device is further to:
for each of a plurality of components in a boot sequence of the computing system;
calculate the first hash value of binary for a corresponding component using the hash function;
determine whether a respective signature associated with the binary of the component is valid; and
extend the current platform configuration register value using a corresponding public key associated with the respective signature if the respective signature is valid to generate a respective first platform configuration value.

13. A system comprising:
a memory to store a public key; and
a hardware processor, operatively coupled to the memory, to:
create a first hash value of a binary of a component of a computing system using a hash function,
retrieve a signature created by a provider of the component from a data store of the computing system;
create a second hash value from the signature created by the provider of the component;
determine whether the signature that is created by the provider of the component is valid from a comparison of the second hash value to the first hash value; and
generate a first platform configuration register value using the public key responsive to a determination that the signature that is created by the provider of the component is valid, wherein the public key is associated with the signature;
validate integrity of the component of the computing system by replacement of a current platform configuration register value in a trusted platform module with the first platform configuration register value; and
generate a second platform configuration register value using the first hash value that is generated from hashing the binary of the component responsive to a determination that the signature that is created by the provider of the component is not valid.

14. The system of claim 13, wherein the public key is a public key of the provider of the component.

15. The system of claim 13, wherein the public key is associated with the component of the computing system.

16. The system of claim 13, wherein the hardware processor is further to:
replace the current platform configuration register value in the trusted platform module with the second platform configuration register value responsive to a determination that the signature is not valid.

17. The system of claim 13, wherein the hardware processor is further to:
for each of a plurality of components in a boot sequence of the computing system:
calculate the first hash value of the binary for a corresponding component using the hash function;
determine whether a respective signature associated with the binary of the component is valid; and
extend the current platform configuration register value using a corresponding public key associated with the respective signature if the signature is valid to generate a respective first platform configuration value.

* * * * *